(12) United States Patent
Perez et al.

(10) Patent No.: US 12,536,309 B1
(45) Date of Patent: Jan. 27, 2026

(54) SYSTEM AND METHOD OF UNIVERSAL BLOCKCHAIN EMAIL ADDRESS FORMAT

(71) Applicant: EtherMail GmbH, Vaduz (LI)

(72) Inventors: Shant Kevonian Perez, Barcelona (ES); Gerald Heydenreich, Frankfurt (DE)

(73) Assignee: EtherMail GmbH, Vaduz (LI)

( * ) Notice: Subject to any disclaimer, the term of this patent is extended or adjusted under 35 U.S.C. 154(b) by 21 days.

(21) Appl. No.: 18/782,006

(22) Filed: Jul. 23, 2024

(51) Int. Cl.
*G06F 21/60* (2013.01)

(52) U.S. Cl.
CPC ................... *G06F 21/606* (2013.01)

(58) Field of Classification Search
CPC .................................................. G06F 21/606
See application file for complete search history.

(56) References Cited

U.S. PATENT DOCUMENTS

| | | | | |
|---|---|---|---|---|
| 10,510,053 | B2 * | 12/2019 | Armstrong | G06Q 20/3678 |
| 10,735,183 | B1 * | 8/2020 | Mehta | H04L 67/1074 |
| 10,846,762 | B1 * | 11/2020 | Dennis | G06Q 20/065 |
| 2005/0144239 | A1 * | 6/2005 | Mattathil | G06Q 10/107 |
| | | | | 709/206 |
| 2008/0165972 | A1 * | 7/2008 | Worthington | H04L 63/06 |
| | | | | 380/278 |
| 2018/0082295 | A1 * | 3/2018 | Boucard | G06Q 20/3672 |
| 2018/0211202 | A1 * | 7/2018 | Ynion, Jr. | G06Q 10/02 |
| 2019/0260761 | A1 * | 8/2019 | Wilson | G06Q 20/145 |
| 2020/0410479 | A1 * | 12/2020 | Giralte | H04L 9/3247 |
| 2021/0182827 | A1 * | 6/2021 | Mohen | G06Q 20/065 |
| 2022/0094739 | A1 * | 3/2022 | Vestemean | H04L 9/0643 |
| 2022/0109562 | A1 | 4/2022 | Feola et al. | |
| 2022/0150202 | A1 * | 5/2022 | Kilburn | H04L 9/3247 |
| 2022/0366442 | A1 * | 11/2022 | Cho | G06Q 20/3678 |
| 2023/0342495 | A1 * | 10/2023 | Turner | G06F 21/6263 |

OTHER PUBLICATIONS

"Sending and Receiving Secure Email based on Blockchain" The 2024 International Conference on Ubiquitous Networking (UNet'24), Rachad (Year: 2024).*

* cited by examiner

*Primary Examiner* — Gary S Gracia
(74) *Attorney, Agent, or Firm* — Steven War, Esq.; War IP Law PLLC

(57) ABSTRACT

The invention describes a method for facilitating secure communications from a sender to a recipient using a Blockchain Address via the Internet, comprising the steps of: receiving a blockchain wallet address and a signature from a sender's client; verifying the blockchain wallet address and the signature of the sender; providing the sender's client a first unique blockchain address; receiving an email from the sender's client wherein the first unique blockchain address is used as the local part of the sender's email address and wherein the local part of recipient's email address is a second unique blockchain address; and sending the email to said recipient via the Internet.

1 Claim, 5 Drawing Sheets

FIG. 4

SYSTEM AND METHOD OF UNIVERSAL BLOCKCHAIN EMAIL ADDRESS FORMAT

TECHNICAL FIELD

The present disclosure relates to a system and method for communications over the Internet using secure, privacy-enhancing email address formats which incorporate blockchain addresses.

BACKGROUND OF THE INVENTION

In the mid 1960's electronic mail (email) was invented to provide near instantaneous communications between computers and individuals using those computers. In the early 1970's the destination of the email message was typically indicated by "username@computer_name". Email messages have been addressed in basically the same way for the last 60 years. In the 1980's Internet Service Providers began electronically connecting people across the world. Today, email is an indispensable part of daily business and personal communications. FIG. 1 illustrates, at a high level, a communications path that an email sent by a sender transverses to arrive in a recipient's mailbox prior to the implementation of the invention disclosed herein.

Typically, an email consists of an envelope, a header, and a body. The envelope generally provides information on where the email originated and the destination of the email. The header of the email generally contains information on the path traveled by the email, the date, the addresses of the sender and the recipient and other technical data. The body of the email generally is the portion where the actual content being transmitted resides.

Simple Mail Transfer Protocol (SMTP) uses Transmission Control Protocol/Internet Protocol (TCP/IP) for sending and receiving email. It is typically used with Post Office Protocol version 3 (POP3) or Internet Message Access Protocol (IMAP) to save messages in a server mailbox and download them periodically from the server for the user.

In computing, the Internet Message Access Protocol (IMAP) is an Internet standard protocol used by email clients to retrieve email messages from a mail server over a TCP/IP connection. IMAP is defined by IETF's RFC 9051.

The Post Office Protocol version 3 (POP3) provides access to an inbox stored within an email server. It executes the "download" and "delete" operations for messages. Thus, when a POP3 client connects to the mail server, it retrieves all messages from the mailbox.

A blockchain is a distributed database that is shared among the nodes of a computer network. Blockchains allow transparent information to be shared across networks. One of the most notable features of a blockchain is its ability to maintain a secure and decentralized record of transactions. Blockchains can be used to prevent the data from being altered. Cryptocurrency users make extension use of blockchains. Blockchain is a "distributed ledger" where decentralization of records makes it impossible for hackers to compromise a system from a single node. Blockchains rely on public-key cryptography/asymmetric cryptography which use public and private keys. The public key is a unique identifier that is paired to an account in a blockchain network. These keys can be used to derive a Public Address, this Public Address like the Public Key, can be freely shared, the Public Address can also be viewed on the blockchain and can be used to receive funds. A private key is an alphanumeric code similar to a digital signature and password and should not be shared with others. The private key permits users to prove ownership and manage their blockchain assets, and manage their information stored within blockchain networks.

A blockchain wallet, or a cryptocurrency wallet, generally allows users to use and oversee cryptocurrencies such as Bitcoin and Ethereum. Generally, the blockchain wallet is a software program that permits the user to monitor transactions and balances of cryptocurrency, allows the user to buy and sell cryptocurrency and to interact with Smart Contracts. Typically, a blockchain wallet can be accessed through any device that is connected to the Internet. Generally, a blockchain wallet only maintains a record of all of the transactions of the cryptocurrency but the storage of the information occurs on the blockchain.

SUMMARY OF THE INVENTION

The invention describes a method for facilitating secure communications from a sender to a recipient using a Blockchain Address via the Internet, comprising the steps of: receiving a blockchain wallet address and a signature from a sender's client; verifying the blockchain wallet address and the signature of the sender; providing the sender's client a first unique blockchain address; receiving an email from the sender's client wherein the first unique blockchain address is used as the local part of the sender's email address and wherein the local part of recipient's email address is a second unique blockchain address; and sending the email to said recipient via the Internet.

BRIEF DESCRIPTION OF THE DRAWINGS

The drawings are meant to illustrate the principles of the invention and do not limit the scope of the invention. The above-mentioned features and objects of the present disclosure will become more apparent with reference to the following description taken in conjunction with the accompanying drawings wherein like reference numerals denote like elements in which:

FIG. 4 illustrates how, by knowing the message that was signed and using the signature generated in FIG. 3, a piece of software can identify the Public Address that signed the message thus proving ownership of that Public Address.

DETAILED DESCRIPTION OF THE INVENTION

Figure 1:
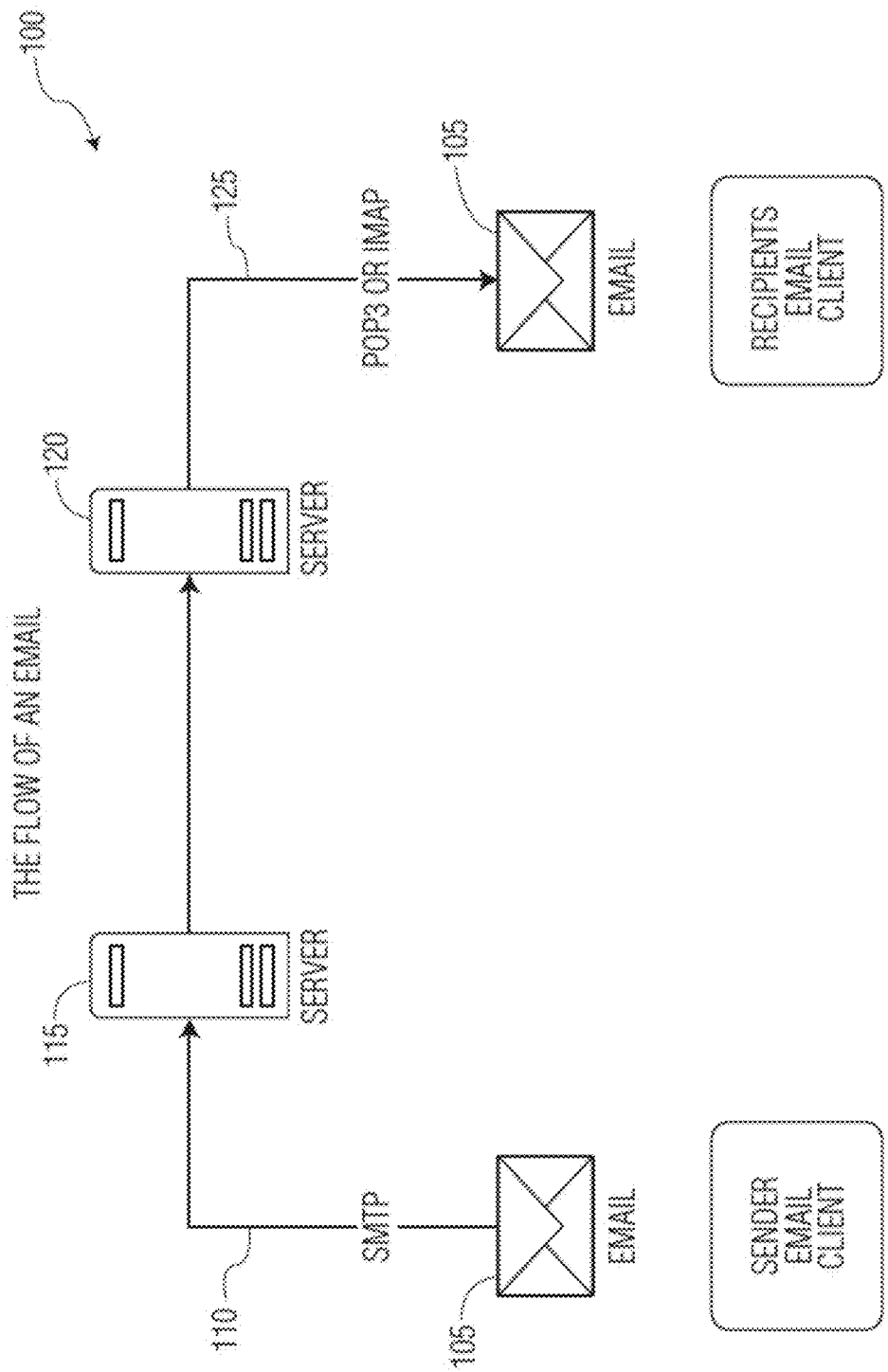
FIG. 1 illustrates, at a high level, a communications path that an email sent by a sender transverses to arrive in a recipient's mailbox prior to the implementation of the invention disclosed herein.

Reference will now be made in detail to the exemplary embodiments of the present disclosure, examples of which are illustrated in the accompanying drawings, wherein like reference numerals refer to like elements throughout. The embodiments are described below so as to explain the present disclosure by referring to the figures. Repetitive description with respect to like elements of different exemplary embodiments may be omitted for the convenience of clarity.

The Universal Blockchain Email Address Format of the present invention is an innovative approach to email communication providing a secure and privacy-enhancing email address format that incorporates blockchain addresses. In general, the format is structured as follows: {blockchainAddress}@{domain}.{tld}. Where "tld" stands for top-level domain. The integration of blockchain addresses with email communication is a novel approach that merges the benefits of blockchain security with the ubiquity of email communications. This innovation represents a unique intersection of technologies to address privacy concerns and enhance security. The integration of blockchain security with email communications is designed to enhance user anonymity, security, and facilitate consent-based marketing.

To understand the innovation, a brief explanation is provided regarding how email accounts are created today and the communications pathway that an email transverses prior to the implementation of the invention. An explanation is also provided as to how the disclosed invention works technologically within the existing protocols.

One of ordinary skill in the art would understand that, before to the transmission of an email prior to the invention, both the sender of the email and the recipient of the email are required to create (or obtain) an email account and have access to that email account, typically through a password. To create (or obtain), and have access to an email account, an individual (or organization on behalf of an individual) would typically perform the following steps:

(1) A person ("the requestor") would typically contact a provider such as Google (ex: gmail) or Hotmail to create an email account and the requestor does so by providing an acceptable username (for example, a username that has not already been taken) (ex: jondoe) and an acceptable password (one that meets the security requirements of the provider). Prior to the implementation of the invention, both the sender and the recipient of the email would need to obtain separate email accounts and access to their respective email accounts.

(2) The provider then creates an email account for the requestor including an email address with the structure {username}@{domain}.{tld}(ex: jondoe@gmail.com} on the provider's servers. "tld" is the abbreviation for Top-Level Domain. The provider also controls access to the email account by establishing a password that is associated with the email account.

(3) The provider then informs the requestor that the requested email account has been established.

(4) the requestor can then use the newly created email address to log in to this account with the username and password combination on a client connected to the provider's server.

(5) the requestor (in this case the sender) can then send emails through his/her newly created account to the recipient.

(6) the recipient can then access his/her previously established email account to receive the email.

FIG. 1 depicts, at a high level, the communications path 100 for a sender's email 105 to traverse to the mailbox of the recipient. An email 105 is created by a sender, for example on a computer or a mobile device (not shown) operated by the sender (sender's communications device), and it is transported, for example, via Simple Mail Transfer Protocol (SMTP) 110 to a server 115 used by the sender's Internet Service Provider (ISP) to support the sender's communication device. Server 115 transmits data representing the email 105 to the Server 120 that belongs to the recipient's provider by the ISP. The Server 120 then transmits the data representing the email via, for example, a POP3 or an IMAP protocol 125, to the computer or mobile device (not shown) operated by a recipient (recipient's communications device). The email is then presented to the recipient on, for example, the screen of the recipient's communications device.

Figure 2:
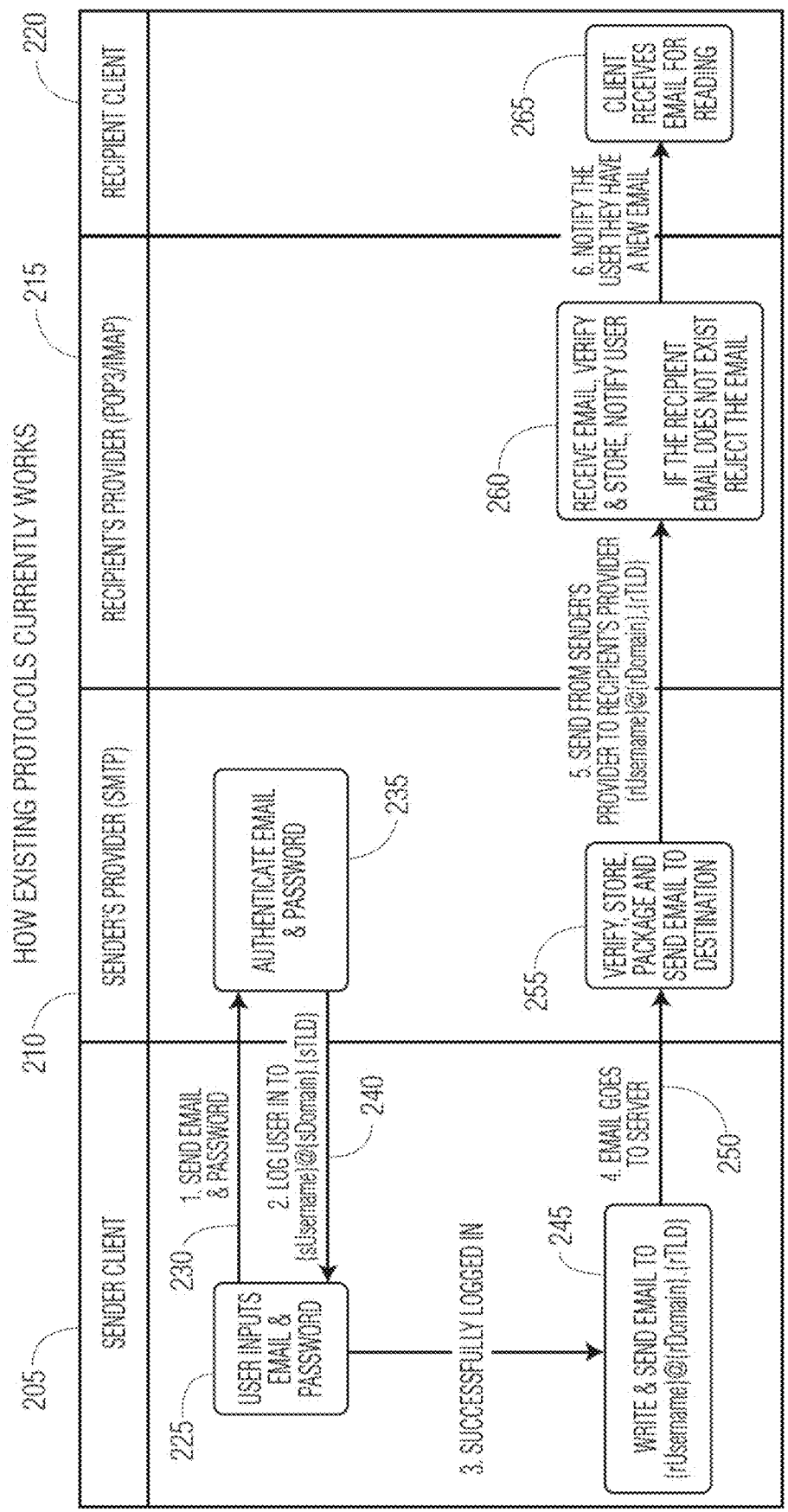
FIG. 2 illustrates the steps of how existing protocols (prior to the implementation of the invention disclosed herein) cooperate to ensure email messages are sent and properly routed to the recipient's communications device.

FIG. 2 illustrates the steps of how existing protocols (prior to the implementation of the invention disclosed herein) cooperate to ensure email messages are sent and properly routed to the recipient's communications device. FIG. 2 is divided into columns for the Sender Client 205, the Sender's Provider 210 (for example SMTP), the Recipient's Provider 215 (for example POP3/IMAP) and the Recipient Client 220. On the sender's communication device, the sender enters his/her email address and password 225. This information is sent 230 to the Sender's Provider which authenticates 235 the email address and password entered by the sender. Once the email address and password are authenticated, the sender is logged in 240 to the Sender's Provider. Once the sender is logged in, the sender writes an email to {rUsername}@{rDomain}.{rTLD} 245 and the email is transmitted 250 to the Sender's Provider 210. The "r" designation indicates the recipient. So, the email is being sent to recipient's Username at recipient's domain. Recipient's top level domain. The Sender's Provider then verifies, stores, packages and sends the email 255 to the destination, i.e., the recipient's provider 215. Once the message is received by the recipient's provider 215, the recipient's provider receives, verifies and stores the email and notifies the recipient of the incoming message 260. If the recipient's email address does not reside on the recipient's provider, the email is rejected and the message (or a notification) is returned to the sender's provider 210. In that case, the sender's provider 210 would then notify the sender that the recipient's email address does not reside on the recipient's provider. If the recipient's email address does exist, the email is sent to the recipient's communication device 265.

The context in which the disclosed invention lies is at the intersection of blockchain and email. In the present email systems, an email message is addressed to the recipient's username. After the implementation of the invention, a provider supporting the Universal Blockchain Email Address uses a public identifier (the blockchainAddress or BCAddress), a message and a cryptographic proof (signature or otherwise) to verify the user. Verification is the process of ensuring that the blockchain email address exists in the provider's server and that the user accessing the provider has demonstrated their ownership of that blockchainAddress or BCAddress. In order for the verification to be successful, the BCAddress must be a valid BCAddress for the blockchain which is being used and the blockchain is not limited to Ethereum or Bitcoin. If the blockchain email address exists in the provider's server, the blockchain email address is used in creating the envelope information for the email. If the blockchain email address does not exist in the provider's server, a blockchain email address is created "on the fly" in the provider's server and then the user is authenticated for that email account.

Figure 3:
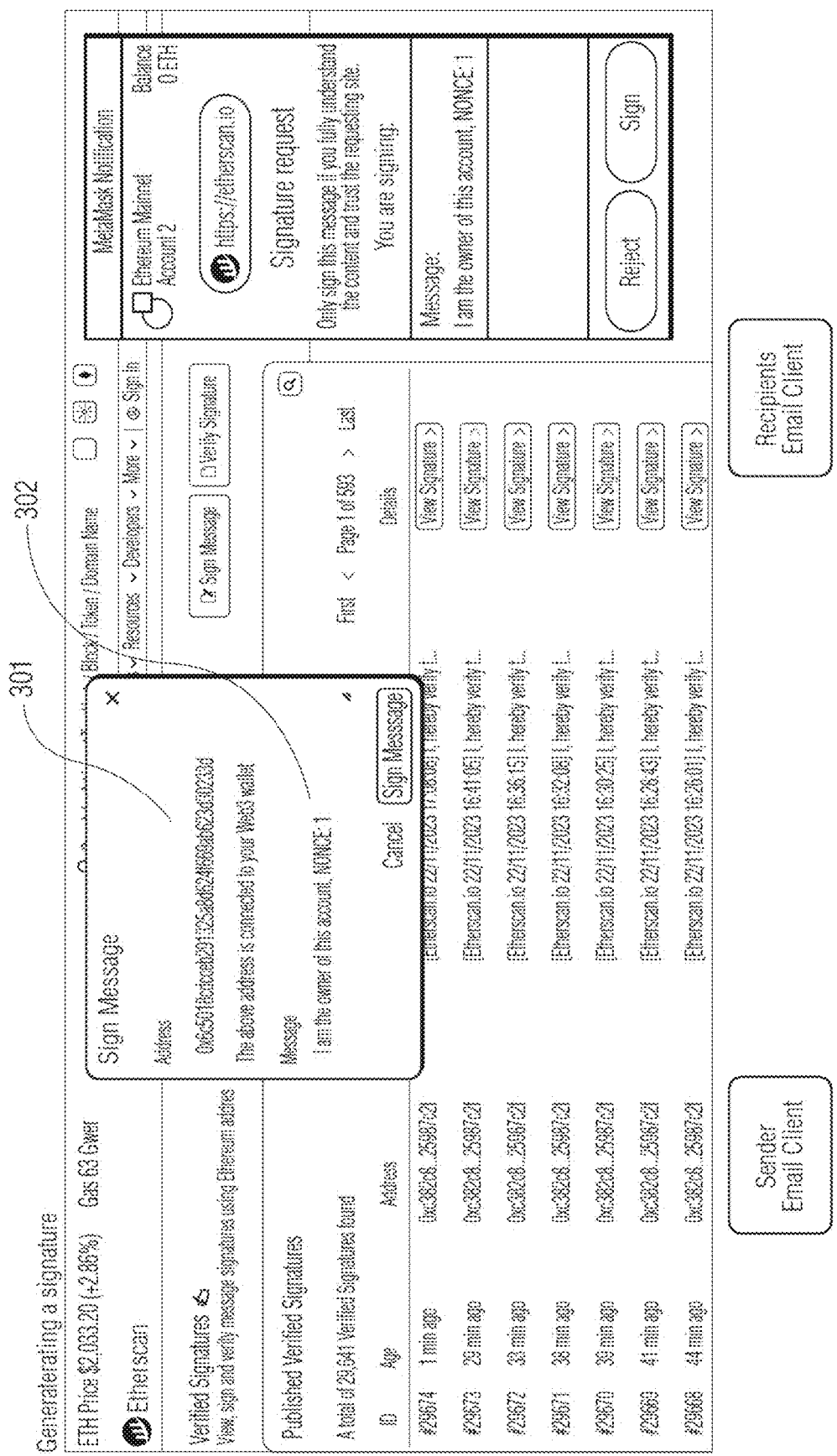
FIG. 3 illustrates how a piece of software can request a user to generate a signature by signing a message with their Blockchain Wallet (Ethereum in this case) which will be used in order to prove their ownership of a Public Address.
Figure 4:
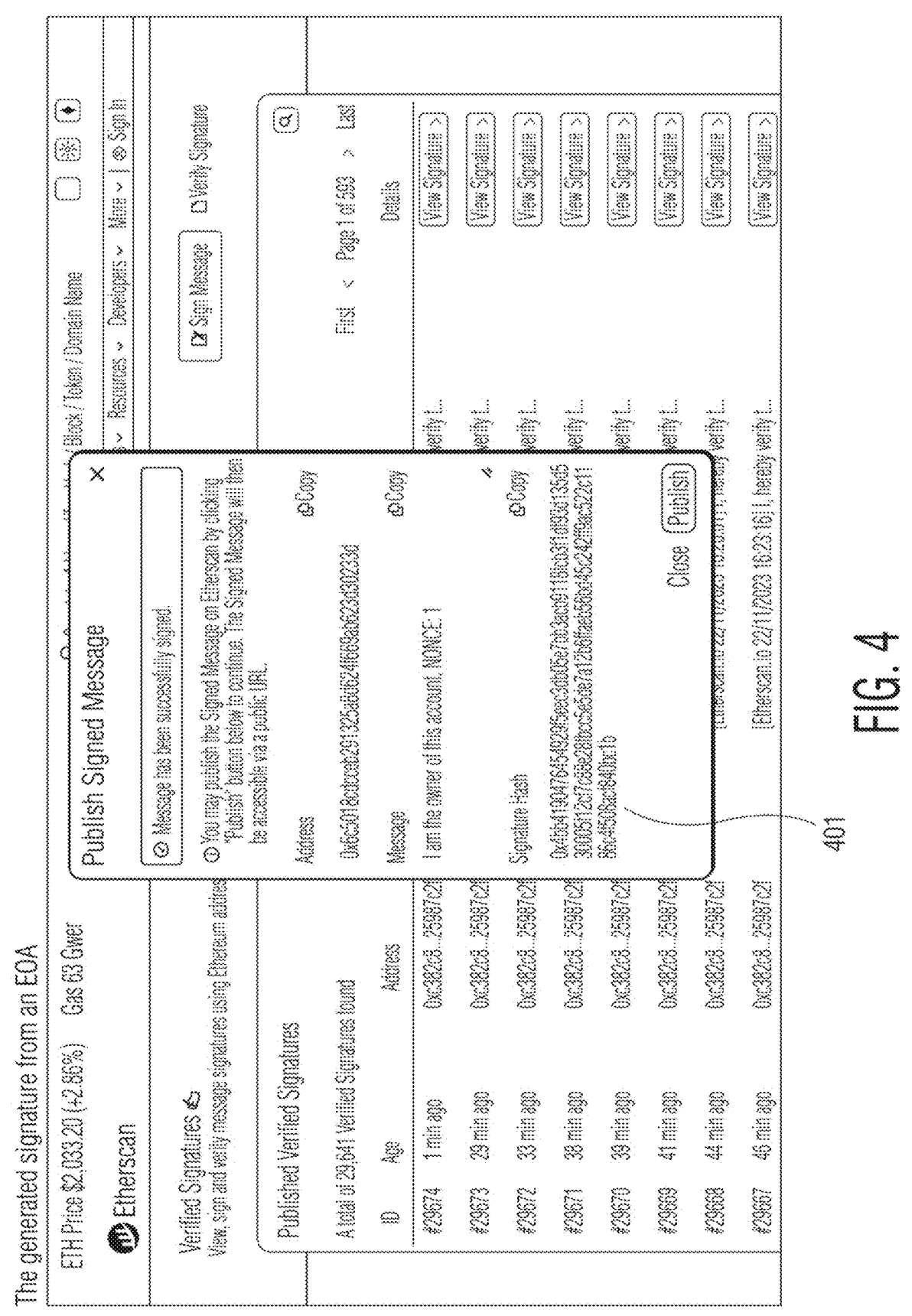

FIG. 3 and FIG. 4. illustrate a visual example of the present invention for how an individual can prove ownership of a Public Address and with the message, signature and Public address identify themselves with a Service Provider to access the email address hosted by the Service Provider in order to deliver an email from a sender to a recipient.

For a more clear explanation the definition of IETF's RFC 5322 (incorporated herein) basically defines the structure of email addresses roughly equal to: {alphaNumericUsername)@{alphaNumericDomain}.{tld}(ex: jondoe123@ gmail.com With this definition there is no way a third party can guess Jon Doe's email address with confidence.

With the claimed innovation, the format is narrowed down to a deterministic username, it would be a strict format where the username adheres to the Public Address definition of the blockchain for which it is built. For example, as of today's implementation on Ethereum the username would need to be a 42-character hexadecimal address.

Assuming a Public Address:
0x71C7656EC7ab88b098defB751B7401B5f6d8976F
Resulting in an email address of the following format:
0x71C7656EC7ab88b098defB751B7401B5f6d8976F@ethermail.io With this definition you can know the destination email address just by knowing the Public Address.

The structure of the created email address is compliant with the IETF's RFC 5322 specification.
Structured as
addr-spec=local-part "@" domain
local-part=dot-atom/quoted-string/obs-local-part
domain=dot-atom/domain-literal/obs-domain
domain-literal=[CFWS]"["*([FWS] dtext) [FWS]"]" [CFWS]
dtext=% d33-90/; Printable US-ASCII
    % d94-126/; characters not including
    obs-dtext; "[", "]", or "/"
Defined as:
An addr-spec is a specific Internet identifier that contains a locally interpreted string followed by the at-sign character ("@", ASCII value 64) followed by an Internet domain. The locally interpreted string is either a quoted-string or a dot-atom. If the string can be represented as a dot-atom (that is, it contains no characters other than atext characters or "." surrounded by atext characters), then the dot-atom form SHOULD be used and the quoted-string form SHOULD NOT be used. Comments and folding white space SHOULD NOT be used around the "@" in the addr-spec.

Note: A liberal syntax for the domain portion of addr-spec is given here. However, the domain portion contains addressing information specified by and used in other protocols (e.g., [IETF's RFC1034], [IETF's RFC1035], [IETF's RFC1123], [IETF's RFC5321]). It is therefore incumbent upon implementations to conform to the syntax of addresses for the context in which they are used.

There are also new scenarios that arise from this innovation, for example emails can be sent to blockchain email addresses before the account is even accessed for the very first time.

With our innovation as detailed in paragraph 29 above a sending user can confidently send an email address to a recipient email address simply by knowing the Public Address. Consequently this gives Service Providers the confidence that they can accept emails destined to a recipient email address just by verifying the format of the username of the recipient and checking that it follows the standard of the Blockchain they are supporting (in the case of Ethereum just by verifying that the username is a 42-character hexadecimal address), this can be seen in FIG. 5.

With the confidence of blockchain technology the Service Provider can accept the email even if the recipient user has not yet created the account themselves and at a later time the user can log in with their Blockchain Wallet, proving the ownership of the Public Address to access the account and see the email waiting for them on their first login. Hence having email in their inbox even before they accessed it for the very first time.

A sender's client can find out the {rBCAddress}@{Domain}.{rTLD} through three primary mechanisms
    ex:
        the recipient has given it to them
        the sender wants to get in touch with someone and finds their address on a service that uses blockchain data (there's are as many possibilities as there are platforms and businesses that leverage this) ex: opensea.io or etherscan.io
        from the blockchain itself Some of the benefits of the disclosed invention are highlighted in the following example:
    In order to log in to a provider that supports the Universal Blockchain Email Address Format you can use an Externally Owned Address.

An Externally Owned Address (EOA), also known as a Wallet Address, refers to a public account that holds funds and is only accessible by the private key pairs. For example, an Ethereum address is a 42-character hexadecimal address which is derived from the last 20 bytes of the public key controlling the account with 0x appended in front.

Thus in our example (FIG. 3):
    Example blockchainAddress (the EOA's Wallet Address):
        0x6C5018CDcCEB291325a8D624f669ab623D3023-3D, reference number 301
    Example message (from the server): "I am the owner of this account, NONCE: 1"

With the EOA's public and private keys in order to sign the message and generate the following signature.
    Example cryptographic proof (a Ethereum Wallet Signature): 0x4bb4190476454929f5eec3db05e7bb3acb9118f cb 3f1 df93d135d530005f12cf7c88e28fbcc5e5d e7a12b6ffae b56bd45c242ff9ac522c1186c4f508acf840bc1b (see 401 FIG. 4).

Figure 5:
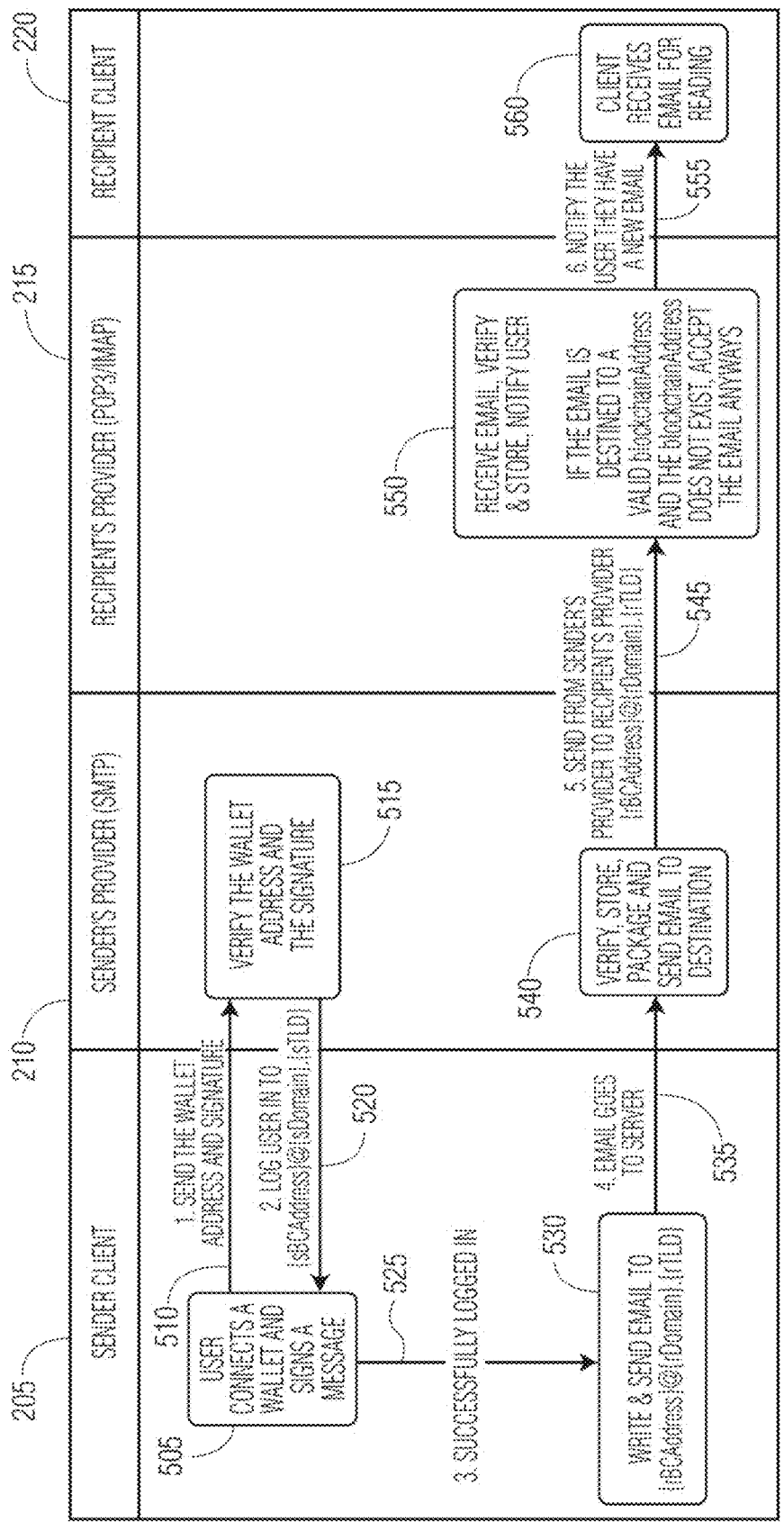
FIG. 5 illustrates the steps of how protocols (after the implementation of the invention disclosed herein) cooperate to ensure email messages are sent and properly routed to the recipient's communications device.

The blockchainAddress that was used to sign and the signature that was just generated are used in FIG. 5 in step 510 to prove ownership over the blockchainAddress in order to log in to the email account that belongs to said blockchainAddress.

Now in order to connect to the provider and gain access to the email address the user has to send the provider's server the blockchainAddress and the signature. The provider will then use the message it requested the user to sign and retrieve the blockchainAddress that signed the signature. If the blockchainAddress is retrieved and the blockchainAddress the user sent are the same the user has proven they are the owner and thus are granted access to that email address (if it exists it will authenticate the user, and if it does not exist it will create the account on the fly and then authenticate the user).

FIGS. 3 and 4 are just a single visual example of it's inputs and its outputs showing how to generate a signature that can be used to prove that a wallet owns an account
    it can be generated in many different ways
    the output of this signature is what's ultimately used in FIG. 5 to obtain access to the account, it's how the server can carry out the "verify the wallet address" step to grant access to the email account the equivalent is:
  instead of saying
    account: jondoe@gmail.com
    password: k6Da3!
  we're saying
    account: 0x71C7656EC7ab88b098defB751B7401B5f6d 8976F@ethermail.io
    password: 0x4bb4190476454929f5eec3db05e7bb3acb9118fcb3f1df93d135d530005f12cf7c8 8e28fbcc5e5de7a12 b 6ffaeb56bd45c242ff9ac522c1186c4f508acf840bc1b As can be seen with the aforementioned example, while it does not affect the general flow of communication in FIG. 1 the innovation can be seen in the details and the differences depicted in FIG. 2 (present day system) and FIG. 5 (after the invention has been implemented) specifically in the authentication and the deliverability.

FIG. 5 illustrates the steps of how protocols (after the implementation of the invention disclosed herein) cooperate to ensure email messages are sent and properly routed to the recipient's communications device.

Like FIG. 2, FIG. 5 is divided into columns for the Sender Client 205, the Sender's Provider 210 (for example SMTP), the Recipient's Provider 215 (for example POP3/IMAP) and the Recipient Client 220. On the sender's communication device, the sender connects a wallet and signs a message 505. This information is sent 510 to the Sender's Provider which verifies the wallet address and the signature 515. Once the wallet address and signature are verified, the sender is logged in 520 to the Sender's Provider as {sBCAddress}@{sDomain}.{STLD}. Where the "s" designation is for the sender. Once the sender is logged in 525, the sender writes an email to {rBCAddress}@{rDomain}.{rTLD} 530 and the email is forwarded 535 to the Sender's Provider 210. The Sender's Provider then verifies, stores, packages and sends the email 540 to the destination, i.e., the recipient's provider 215. Once the message is received by the recipient's provider 215, the recipient's provider receives, verifies and stores the email and notifies the recipient of the incoming message 550. If the recipient's email address exists, the recipient is notified that they have a new email 555 and the email is sent to the recipient's communication device 560. Otherwise, if the recipient's email address does not reside on the recipient's provider (in other words, it does not exist), the provider would go ahead and create the recipient's email account on the fly if it chose to and could store the email. This would for example allow the user with the wallet to access the email account at a later date and see the email waiting for them.

The Universal Blockchain Email Address Format thus affects the authentication protocols in the existing protocols and the format of the address-spec in the IETF's RFC 5322.

The benefits of the invention disclosed herein include the following:

Anonymity: Integration with Blockchain addresses provides a level of user anonymity, as the blockchain address itself does not reveal personal information. This aligns with the growing demand for privacy in online communication.

Compatibility: The format seamlessly integrates with existing infrastructure. It generally aligns with standard email protocols, making it compatible with all email systems, servers, and clients.

Security: Leveraging blockchain technology enhances the security of email communication. Cryptographic methods used in blockchain addresses contribute to a secure and tamper-resistant email system.

Consensual Marketing: Users have the option to consent to marketing communications by sharing their Universal Blockchain Email Address. This consent-based approach respects user preferences and privacy.

Versatility: The proposed format is adaptable to various industries and communication scenarios. It accommodates the needs of governmental agencies, private enterprises, healthcare institutions, and personal connections.

Payment via Email: The format allows for direct payments to be initiated via email. Users can seamlessly transact Ether or other supported tokens associated with their Blockchain address directly from their email client.

Direct Share/Token Holder Communication: Companies can reach their current share or token holders directly through this format, streamlining communication and fostering a direct link between companies and their stakeholders.

Legal Compliance: The integration of blockchain addresses for email communication provides a framework that aligns with emerging legal standards related to data privacy and security, ensuring compliance with applicable regulations.

The inventive process of the disclosed invention involves a careful consideration of the security and privacy challenges in traditional email communication. The non-obviousness is evident in the thoughtful integration of Blockchain addresses, providing a solution that aligns with evolving privacy expectations.

The format of the disclosed invention allows for variations in domain and Top-Level Domain (TLD) to accommodate individual or organizational preferences. Additionally, the disclosed invention supports the integration of various blockchain addresses beyond Ethereum and Bitcoin for broader compatibility.

The disclosed Universal Blockchain Email Address Format offers a pioneering solution for secure, private, and consent-driven email communication. By combining the anonymity of Blockchain addresses with the versatility of email, this format addresses current challenges and opens new possibilities for secure and direct interactions.

Unless defined otherwise, all technical terms used herein have the same meaning as commonly understood by one of ordinary skill in the art to which this invention belongs. Any methods and materials similar or equivalent to those described herein also can be used in the practice or testing of the present disclosure It must be noted that as used herein and in the appended claims, the singular forms "a", "and", and "the" include plural references unless the context clearly dictates otherwise.

While the present disclosure has been described with reference to the specific embodiments thereof, it should be understood by those skilled in the art that various changes may be made and equivalents may be substituted without departing from the true spirit and scope of the invention. In addition, many modifications may be made to adopt a particular situation, material, composition of matter, process, process step or steps, to the objective spirit and scope of the present disclosure. All such modifications are intended to be within the scope of the claims appended hereto.

The invention claimed is:

1. A method for facilitating secure communications from a sender to a recipient using a Blockchain Address via the Internet, comprising the steps of:

receiving a blockchain wallet address and a signature from a sender's client;
verifying said blockchain wallet address and said signature of said sender;
providing said sender's client a first unique blockchain address;
receiving an email from said sender's client wherein said first unique blockchain address is used as the local part of the sender's email address and wherein the local part of recipient's email address is a second unique blockchain address; and
sending the email to said recipient via the Internet.

\* \* \* \* \*